Patented Oct. 21, 1947

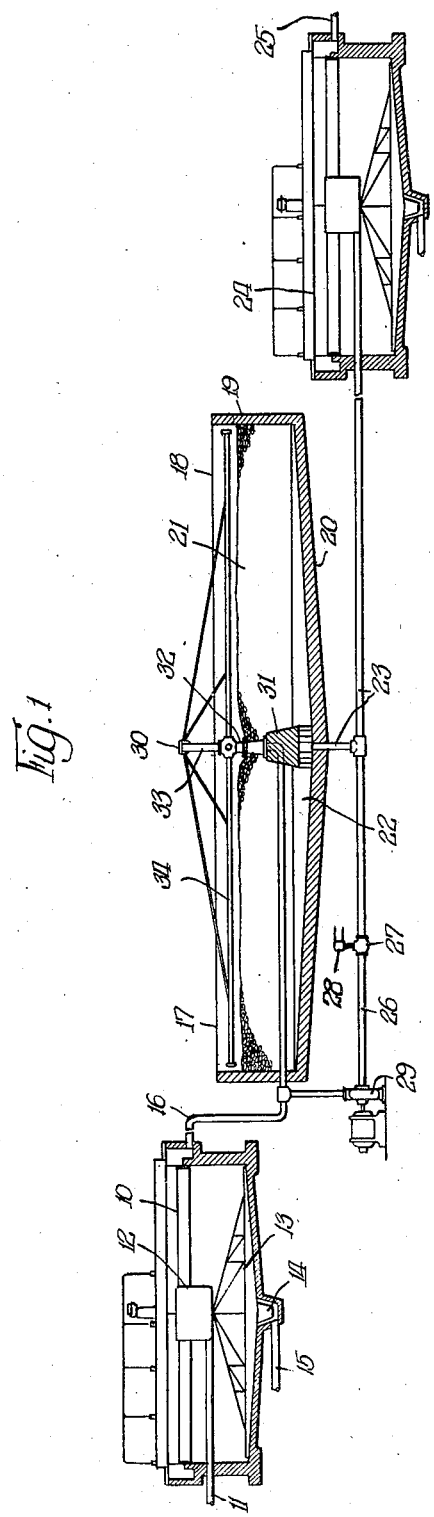
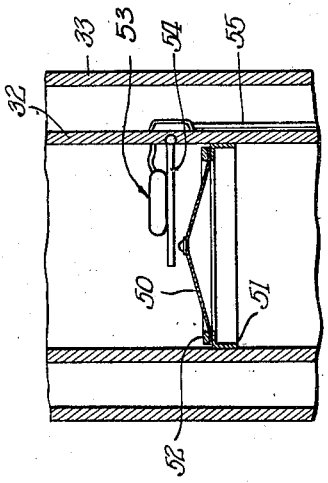
INVENTOR.
Herbert W. Gillard,

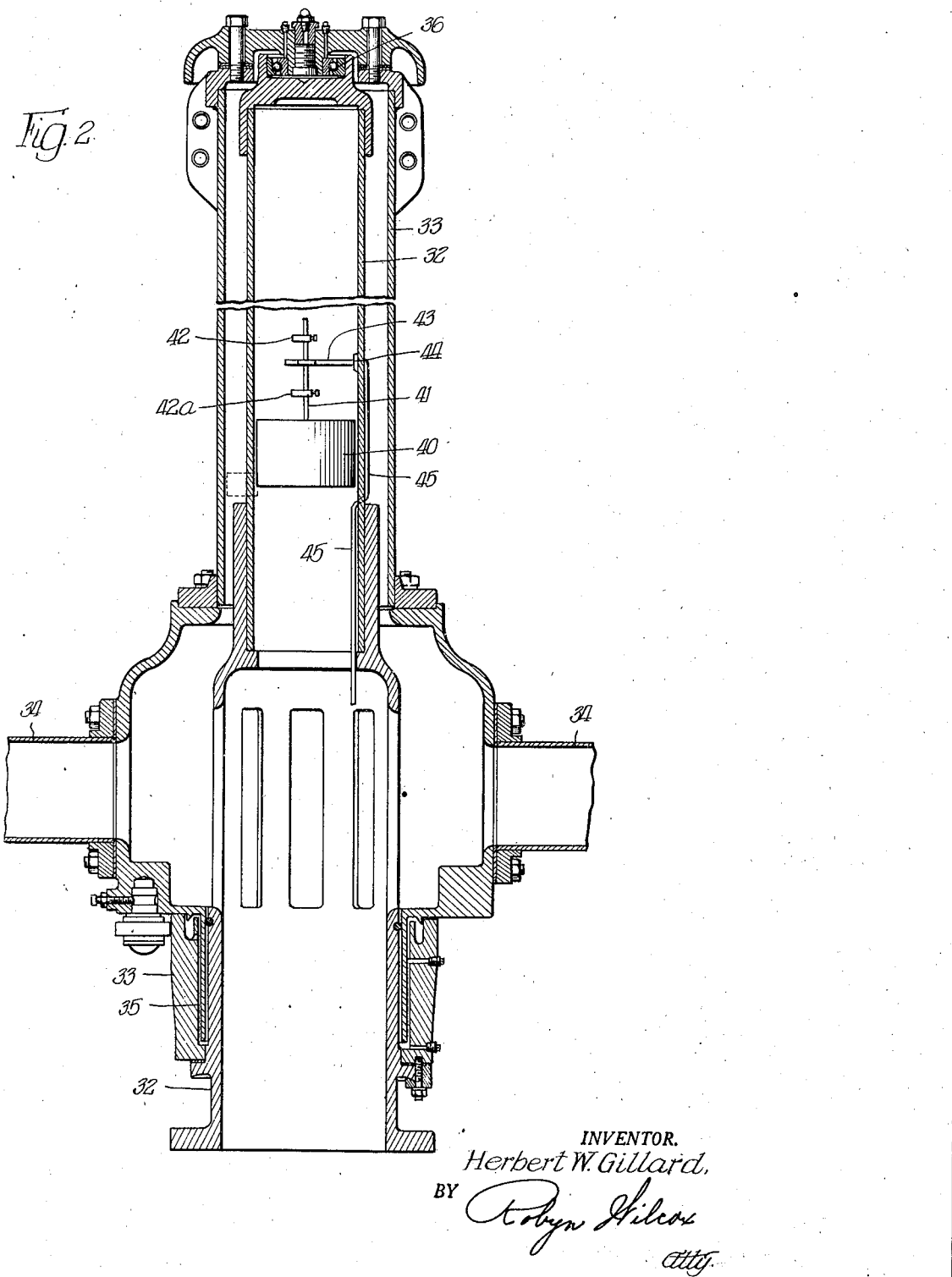

2,429,312

UNITED STATES PATENT OFFICE 2,429,312

APPARATUS FOR CONTROLLING THE RATE OF DISCHARGE FROM A LIQUID DISTRIBUTOR FROM CHANGES IN THE LIQUID HEAD WITHIN THE DISTRIBUTOR

Herbert W. Gillard, Oak Park, Ill., assignor to Infilco Incorporated, Chicago, Ill., a corporation of Delaware Application March 5, 1943, Serial No. 478,161

8 Claims. (Cl. 210—7)

This invention relates to an improvement in apparatus and process for maintaining a uniform distribution, and a uniform rate of discharge, of liquid from a liquid distributor.

One use of my invention is in the treatment of sewage and other polluted liquids, and more specifically in the treatment of such liquids on trickling filters. In this type of treatment, the sewage generally comes from some kind of primary treatment, such as a grit chamber or a primary settling tank, and is sprayed over a bed of contact material. Such liquid while trickling through said bed is purified by oxidation, which may be either chemical, or biological from the action of aerobic bacteria which develop on the filter medium and feed on the organic matter contained in the sewage, or both. While the invention will be described in connection with such a trickling filter it will be obvious that it can be used for any purpose where uniform spraying of liquid is desired.

In order to obtain highest results from a given volume of filter material it is important that the sewage be distributed as uniformly as possible over the bed, and for this, and other reasons, the rate of discharge over the bed should be maintained as constant as possible within certain limits, regardless of whether the actual rate of application to the filter is high, as in modern high rate trickling filters, or moderate, as in conventional trickling filters. Obviously sprays and nozzles must be designed for a given flow and pressure of liquid, and if these are not maintained the liquid flows out in a single stream rather than being properly sprayed, so that a small portion of the filter bed will receive an excess while the major part will receive no liquid. Also, when the liquid is properly sprayed much air is entrained by the fine sprays of liquid and brought into the bed so that the bed is well aerated, which is very important for a proper functioning of the filter. However, as is well known, the amount of flow to a sewage treatment plant varies greatly from hour to hour during the day and also from season to season. It is therefore advisable to secure a uniform rate of application of sewage to a filter in spite of fluctuations in supply over an extremely wide range. The best way of approaching the problem is to maintain a predetermined operating head of the liquid being sprayed. Various methods and means have been tried for maintaining at all times a sufficient and uniform operating head for trickling filters in spite of these varying sewage flows.

The problem has been attacked from different angles. One way is to reduce the discharge area when the flow decreases, thus gaining head for the reduced area still in use. This method requires rather complicated constructions for distributor arms, nozzles, or other parts of the distributor in order to remove from service some of the discharge elements when the flow decreases. This is also no true solution of the problem as it provides uniformity of distribution from certain nozzles, or sprays, only and not uniformity of rate of discharge over the filter bed as a whole. The efficiency of a filter depends, however, just as much on a uniform rate of discharge as on a uniform distribution. A trickling filter medium is not efficiently utilized when dosed with low flows, however uniformly they may be sprayed over the bed. Moreover, this system does not respond to the smaller variations of flow, as only fixed amounts of discharge area can usually be removed from service; thus neither the rate for the full, nor for the reduced area can be really constant and distribution will therefore not be uniform.

Another method is to provide means for equalizing the flow to the distributor so as to have at all times the same head available for operation of the distributor. This second approach to the problem consists of maintaining a constant flow of liquid to the distributor. One of the simplest ways for providing a constant and uniform flow of liquid to the distributor is to supplement the variable flow of sewage coming from the primary treatment by inversely varying quantities of trickling filter effluent. This is usually done by passing the sewage to be treated into a control tank and returning into that tank a sufficient quantity of filter effluent to maintain a constant head in the distributor. The quantity of effluent to be returned has heretofore been controlled in known manner by a switch operated from a float in the control tank, so that operation of a main or auxiliary recirculation pump or of a flow control valve in the recirculation line was controlled from variations in the liquid level of the control tank.

While the use of an equalizing or control tank is definitely objectionable in a conventional trickling filter that has no recirculation, it is less so in a filter where recirculation of filter effluent is provided. In the modern high rate filters utilizing return flows the detention time in such a control tank is shortened, and also the effluent, which has just been well aerated in the filter and is rich in active bacterial growths, will prevent septicity which might otherwise arise upon prolonged detention in the equalizing tank. However, it is an expensive means of providing a constant flow to the distributor.

It is an object of my invention to provide a constant flow of liquid to a sewage distributor by means which are simpler, more direct, and cheaper than have heretofore been used.

It is another object of my invention to provide a constant head for a sewage distributor.

Another object is to control by simple and efficient means the quantity of filter effluent to be recirculated.

Another object is to provide for uniform distribution of sewage over a filter bed.

Another object of my invention is to maintain by simple means a sufficient operating head for a distributor.

I have found that I can dispense with the use of a control tank for the purpose described and maintain a constant and sufficient operating head for a sewage distributor by direct means that are simpler, less costly and equally efficient. It is, therefore, a further object of my invention to replace the control tank of a sewage plant of the type described above by simple, cheap and efficient means.

More specifically I propose to place a control mechanism for the operating head inside the distributor itself in such a manner that variations in the liquid level or head in the distributor will actuate the mechanism to keep the amount of flow to the distributor constant or within predetermined limits. It is an important object of this invention to control the operating head of a sewage distributor from variations in the liquid level or head within the distributor.

It is another object to control the recirculation in a high rate trickling filter from variations in the liquid level or head of the distributor.

This control can be had by various means. I may place, for instance, a means responsive to changes in liquid level, such as a float, inside the distributor and connect it to any means for keeping a flow of liquid constant, such as a valve in the recirculation line whose opening can be adjusted by movements of such float to admit more filter effluent as the float responds to a lowering of the liquid level in the distributor, and vice versa. Or I may place a pressure sensitive member, such as a flexible diaphragm, in the distributor, which will respond to changes in pressure or head in the distributor, and control by the movements of this member a valve or similar device to keep the flow of liquid to the distributor adequate and uniform.

It is, therefore, another object of this invention to control the operating head of a sewage distributor from variations in head or pressure within the distributor.

Other objects of the invention will become apparent from the description and claims to follow.

It is desirable to maintain a certain amount of recirculation at all times, so as to bring continuously liquid containing active bacteria back into the filter. It is also an advantage to give the sewage the benefit of a repeated treatment by the action of the aerobic bacteria in the filter. However, if desired, the control mechanism can be so adjusted as to eliminate recirculation entirely at maximum sewage flows and to admit quantities of filter effluent corresponding to a decrease in the sewage flow. It is to be understood that with my new means for controlling the flow to the distributor and the operating head therein, any desired ratio of sewage flow to recirculation can be provided.

The invention will be more fully understood by reference to the drawings which show, for purposes of illustration and exemplification, preferred embodiments of my invention and in which like reference characters designate similar elements.

Figure 1 is a diagrammatic sectional view of a plant utilizing my invention;

Figure 2 is a vertical sectional view of one embodiment of my invention; and

Figure 3 is a vertical sectional view of another embodiment of my invention.

In most plants, as shown in Figure 1, sewage which may have been treated to remove coarser solids and grit, is passed into a primary settler or clarifier 10 in which the sewage to be treated undergoes quiescent clarification prior to its treatment on the trickling filter. The clarifier 10 has an inlet conduit 11 for sewage to be clarified, which may discharge into the clarifier 10 in any suitable manner, as into a center well 12, as shown. Solids settling in the clarifier 10 may be scraped by sludge scraping mechanism 13 into a sump 14 from where they may be withdrawn through a sludge outlet 15 to a digester or other sludge treating device, not shown. Clarified sewage flows from the primary settler 10 through a conduit 16 to a trickling filter 17. The trickling filter 17 comprises a suitable basin 18 usually circular in shape, and having an upstanding boundary wall 19 and a bottom 20 which may slope slightly, as shown, and a bed of discrete contact material 21 arranged in known manner. A liquid collecting chamber 22 underlies the filter bed 21. Liquid that has trickled through the filter bed 21 is collected in the collecting chamber 22 and is lead from the filter through an effluent conduit 23 to a final clarifier 24 which may be similar in construction to the primary clarifier 10. Effluent from the secondary clarifier 24 can usually be discharged to waste, as from a waste pipe 25. Suitable recirculation of filter effluent is provided by a recirculation conduit 26 leading from the filter effluent conduit 23 to the filter inlet conduit 16. A valve 27 operated by a suitable solenoid 28 and a pump 29 are provided in the recirculation conduit 26 to regulate the flow therethrough, from the effluent conduit 23 back to the filter inlet conduit 16.

Centrally arranged in the trickling filter basin 18 is a rotary distributor 30, preferably of the reaction driven type. Such a distributor may comprise a center column 31 affording passage for liquid entering the filter 17, through the inlet conduit 16, for flow upwardly through said column. The center column 31 is constructed in two parts: a stationary member 32 into which the conduit 16 discharges, and a rotatable member 33 from which liquid flows into discharge arms 34 which are affixed to the rotating member 33 and from which the liquid is sprayed through nozzles, not shown, over the filter bed. As shown in Figure 2, the rotating member 33 may be mounted over the fixed or stationary member 32 by any suitable means, such as a thrust bearing 36 at the upper end of the fixed member 32 and the lower end of the rotating part 33 may be sealed against escape of liquid by any suitable means, such as a mercury seal 35.

As shown in Figure 2, a float 40 may be used to control operation of the recirculation control valve 27 and is so arranged as to rest on the liquid surface of the center column 31. An upwardly extending float rod 41 is rigidly secured at its lower end to the float 40 and carries two adjustable collars 42 and 42a. A pivoted switch arm 43 encircles the rod 41 and extends horizontally from a switch 44 of any suitable type. The arrangement of the collars 42 and 42a and the switch arm 43 is such that the upper collar 42 will engage the switch arm when the float is at its predetermined lowermost position and the lower collar 42a will engage the switch arm when the float is at its predetermined uppermost position. The switch 44 is preferably mounted on the wall of the stationary distributor member 32 and is connected by suitable wiring taken through waterproof conduit 45 to the solenoid 28 which positions the recirculation control valve 27. The construction and arrangement of the float 40, float rod 41, collars 42 and 42a, switch arm 43, and switch 44, is such that when the float rises above a predetermined level, the lower collar 42a will lift the switch arm 43 and thereby position the switch 44 to actuate the solenoid 28 to close the valve 27. When the arm is depressed by the upper collar 42 the switch will be positioned to actuate the solenoid 28 to open the valve 27. When the level of liquid in the distributor is such that neither collar contacts the switch arm 43, and it can assume a normal horizontal position, the recirculation control valve 27 will remain in its previous position.

In operation sewage which has been clarified in the primary clarifier 10 flows through the inlet conduit 16 and enters the center column 31 of the rotary distributor 30 flowing upwardly therethrough, into the discharge arms 34 and out through them over the filter bed 21. The liquid that has thus been distributed over the filter bed trickles through the bed and is collected in collecting chamber 22 to be discharged from the filter. The pump 29 which preferably will operate continuously, returns liquid discharged from the filter through the recirculation conduit 26 to the filter inlet. Liquid that is not returned through the conduit 26 by the pump 29 flows through the effluent conduit 23 to the final settler 24. The amount of liquid that reaches the filter through the conduit 26 is controlled by the control valve 27. It will be obvious that when the valve 27 is in its fully open position a maximum amount of filter effluent is returned to the filter. As the valve is moved gradually to closed position an increasing amount of the filter effluent is prevented from passage through the recirculation conduit 26 and now flows to the final settler 24. The operation of the valve 27 is controlled from the movements of the float 40 riding on the liquid surface within the center column 31 as above described. By proper setting of the collars 42 and 42a the movement of the valve 27 can be held to maintain the head in the column 31 within predetermined limits.

Figure 3 shows a modification of the apparatus of my invention in which a flexible diaphragm 50 takes the place of the float 40 of Figure 2. The diaphragm is mounted at the desired level by suitable flanges 51 and 52. A suitable switch, such as the "mercoid" switch 53, shown in the drawing, is so mounted that movement of the pivoted arm 54 will control the flow of power to the solenoid 28 and thereby position the recirculation control valve 27. The wiring to the switch can be carried in any suitable means, such as a conduit 55. As shown in Figure 3, the diaphragm 50 is bulging upwardly under a maximum head in the distributor and the switch arm 54 is positioning the switch 53 to move the control valve 27 toward closed position. When the head in the distributor falls to a predetermined point the diaphragm will be in its contracted horizontal position and the switch arm 54 will position the switch 54 to move the valve 27 toward its open position.

It will be obvious to those skilled in the art that instead of controlling a valve in the recirculation conduit from the liquid level in the distributor, described above, which have been heretofore controlled from a float in a control tank, other flow regulating means, such as for instance pump 29, could be connected to and controlled from the float or diaphragm operated switch. Regardless of the means used, the amount of recirculated filter effluent which will be returned to the filter will at all times be adequate to maintain the head in the distributor within predetermined limits.

It will be obvious that my invention is not limited to a plant utilizing direct return of filter effluent to the filter, but can be used with any system of recirculation, whether it be the return of liquor, sludge or effluent from a final clarifier to the filter or to a primary clarifier, or the return of filter effluent to a primary clarifier. In each such case a control valve such as valve 27, installed in the respective recirculation conduit, will control the amount that is recirculated from the liquid level in the center column in a way similar to that shown in the embodiment described above.

It will be understood also that such trickling filters and distributors, as well as the accompanying settling tanks, pumps, conduits, etc., through which the flows are caused and take place can be constructed and arranged in various ways. Such things are themselves well known in the art and are not considered by me to be in themselves invention on my part. My invention resides in the control and the mechanism for control of flows as set forth in the accompanying claims.

I claim:

1. A sewage treatment apparatus comprising a trickling filter bed, a sewage distributor having a center column including a rotatable portion, a passageway for sewage through said center column, an inlet into said passageway, sewage discharge arms leading from said rotatable portion and extending over said bed, an outlet from said filter bed, a conduit from said outlet to said inlet, a power actuated flow regulating device in said conduit, a power circuit joined to said device, and a control assembly within said center column connected to said power circuit including a member positionable by changes in head of liquid within said center column to open or close said circuit in response to increase or decrease of said head.

2. In combination with a distributor having a stationary part and a rotatable part operatively connected with each other for liquid flow therethrough, said rotatable part including discharge passageways, an inlet into said distributor, an effluent conduit receiving liquid discharged from said distributor, means including a recirculation conduit and a pump for return flow of liquid from said effluent conduit to said distributor inlet, improved means for controlling flow through said recirculation conduit to maintain the liquid head in said distributor within predetermined limits, comprising a flow regulating valve in said recirculation conduit, a power operated valve positioning device joined to said valve, a power circuit connected to said valve positioning device, and power control means within said stationary part and positionable to open and close said circuit in response to increase and decrease of head of the liquid in said stationary part, said power circuit being connected to said control means.

3. In a sewage treating apparatus the combination of a filter bed, a rotary distributor for distributing liquid over said filter bed, an inlet to said distributor, an outlet from said filter bed, and means including conduits and a flow regulating device operatively connected with said conduits for selectively passing varying quantities of liquid from said outlet to waste and from said outlet back to said inlet, with a control device located within said distributor controlling flow through said flow regulating device from variations in the head within the distributor.

4. In a sewage treating apparatus comprising a trickling filter bed, a sewage distributor including a column, a passageway for sewage through said column, an inlet into said passageway, and sewage discharge means from said column, means for controlling the discharge through said discharge means from variations in the liquid level within the column comprising a member within the column responsive to changes in the liquid level therein, a power operated flow regulating device operatively associated with said inlet and regulating flow thereinto, and a power circuit operatively connecting said responsive member and said flow regulating device.

5. Apparatus according to claim 4 wherein said member comprises a float.

6. Apparatus according to claim 4 wherein said member comprises a flexible diaphragm.

7. In a trickling filter comprising a filter bed, a rotary distributor for distributing sewage over said filter bed, an inlet to said distributor, an outlet from said filter bed, a conduit for return flow of liquid from said outlet to said inlet, a pump for causing such return flow, and a valve in said conduit, improved means for maintaining a uniform flow of liquid into said distributor comprising a float within said distributor, a switch operated by said float, valve positioning means, and a power circuit passing through said switch and said valve positioning means.

8. In a sewage treating apparatus comprising a primary treatment unit, a trickling filter including a filter bed and a sewage distributor, an outlet from said filter, and a conduit from said primary unit to said filter, improved means for maintaining a uniform flow of liquid to the distributor independently of the flow of sewage from said primary treatment unit to said filter, said means comprising a recirculation conduit leading from said outlet and discharging into said conduit from said primary unit to said filter, a pump on said recirculation conduit, a flexible diaphragm adjacent the liquid surface within said distributor, a switch adapted to be positioned by said diaphragm, a flow regulating valve in said recirculation conduit, a valve positioning device joined to said valve and a power circuit joining said switch to said valve positioning device.

HERBERT W. GILLARD.

REFERENCES CITED

The following references are of record in the file of this patent:

UNITED STATES PATENTS

| Number | Name | Date |
| --- | --- | --- |
| 2,290,790 | Yeomans | July 21, 1942 |
| 2,103,887 | Bowen et al. | Dec. 28, 1937 |
| 1,239,229 | Shaw | Sept. 4, 1917 |
| 1,705,118 | Jackson | Mar. 12, 1929 |
| 2,091,166 | Shiels | Aug. 24, 1937 |
| 2,176,174 | Gelakoski | Oct. 17, 1939 |
| 1,698,787 | Garraway | Jan. 15, 1929 |
| 2,283,166 | Buell et al. | May 19, 1942 |
| 2,214,188 | Walker | Sept 10, 1940 |
| 2,090,405 | Shook | Aug. 17, 1937 |
| 2,301,025 | Friend et al. | Nov. 3, 1942 |
| 2,308,866 | Dekema | Jan. 19, 1943 |
| 2,168,208 | Jenks | Aug. 1, 1939 |
| 1,078,623 | Jones et al. | Nov. 18, 1913 |
| 1,056,044 | Muchka | Mar. 18, 1913 |
| 1,930,592 | Harnsberger | Oct. 17, 1933 |
| 2,141,979 | Halvorson et al. | Dec. 27, 1938 |
| 2,097,779 | Shook | Nov. 2, 1937 |
| 2,317,782 | Levine | Apr. 27, 1943 |